United States Patent [19]
Frazier

[11] 3,955,471
[45] May 11, 1976

[54] MACHINE TOOL SPINDLE

[75] Inventor: James L. Frazier, Los Alamitos, Calif.

[73] Assignee: Houdaille Industries, Inc., Buffalo, N.Y.

[22] Filed: Oct. 9, 1974

[21] Appl. No.: 513,318

Related U.S. Application Data

[62] Division of Ser. No. 238,434, March 27, 1972, Pat. No. 3,893,371.

[52] U.S. Cl. ............................. 90/11 D; 408/239 A
[51] Int. Cl.² ................................................ B23Q 1/08
[58] Field of Search ....................... 90/11 A, 11 D; 408/239 A, 239; 279/1 B; 29/26 A

[56] References Cited
UNITED STATES PATENTS

| | | |
|---|---|---|
| 3,171,327 | 3/1965 | Williamson ........................ 29/26 A |
| 3,191,260 | 6/1965 | Jorgensen ......................... 29/26 A |
| 3,271,853 | 9/1966 | Pfister .............................. 29/26 A |
| 3,604,083 | 9/1971 | Antonietto et al. ................ 29/26 A |
| 3,651,739 | 3/1972 | Wolt .......................... 408/239 A X |
| 3,709,623 | 1/1973 | Stephan et al. ............... 29/26 A X |

*Primary Examiner*—Travis S. McGehee
*Assistant Examiner*—Z. R. Bilinsky
*Attorney, Agent, or Firm*—Hill, Gross, Simpson, Van Santen, Steadman, Chiara & Simpson

[57] ABSTRACT

A machine tool includes a head which supports a vertically movable quill within which there is disposed a rotatable spindle to which various kinds of cutting tools may be attached. Within the quill there is provided a spring-biased annular piston for operating actuating means that are connected to clamping members for clamping onto and for releasing tooling from the spindle when it is in its locked position.

7 Claims, 6 Drawing Figures

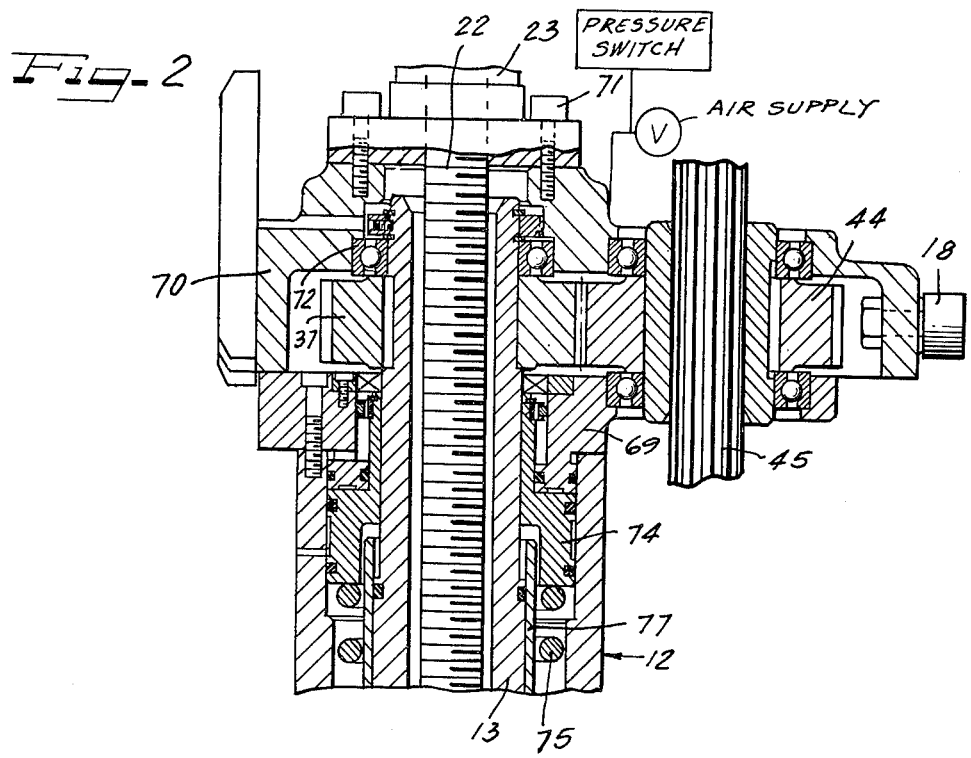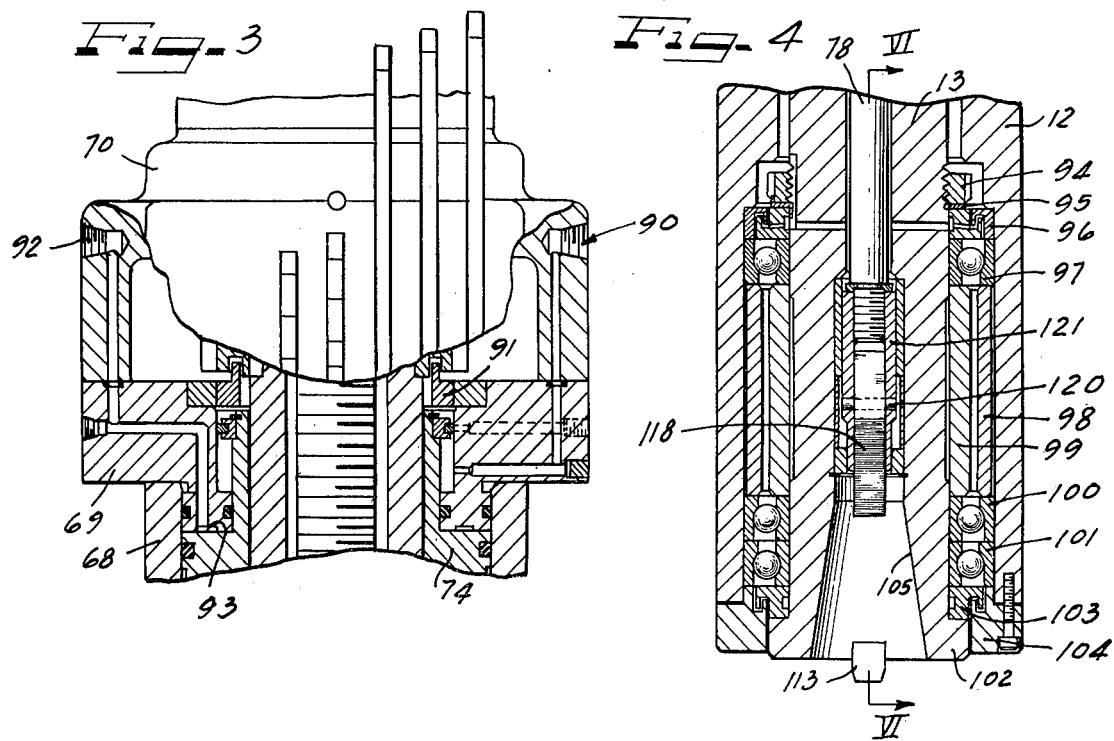

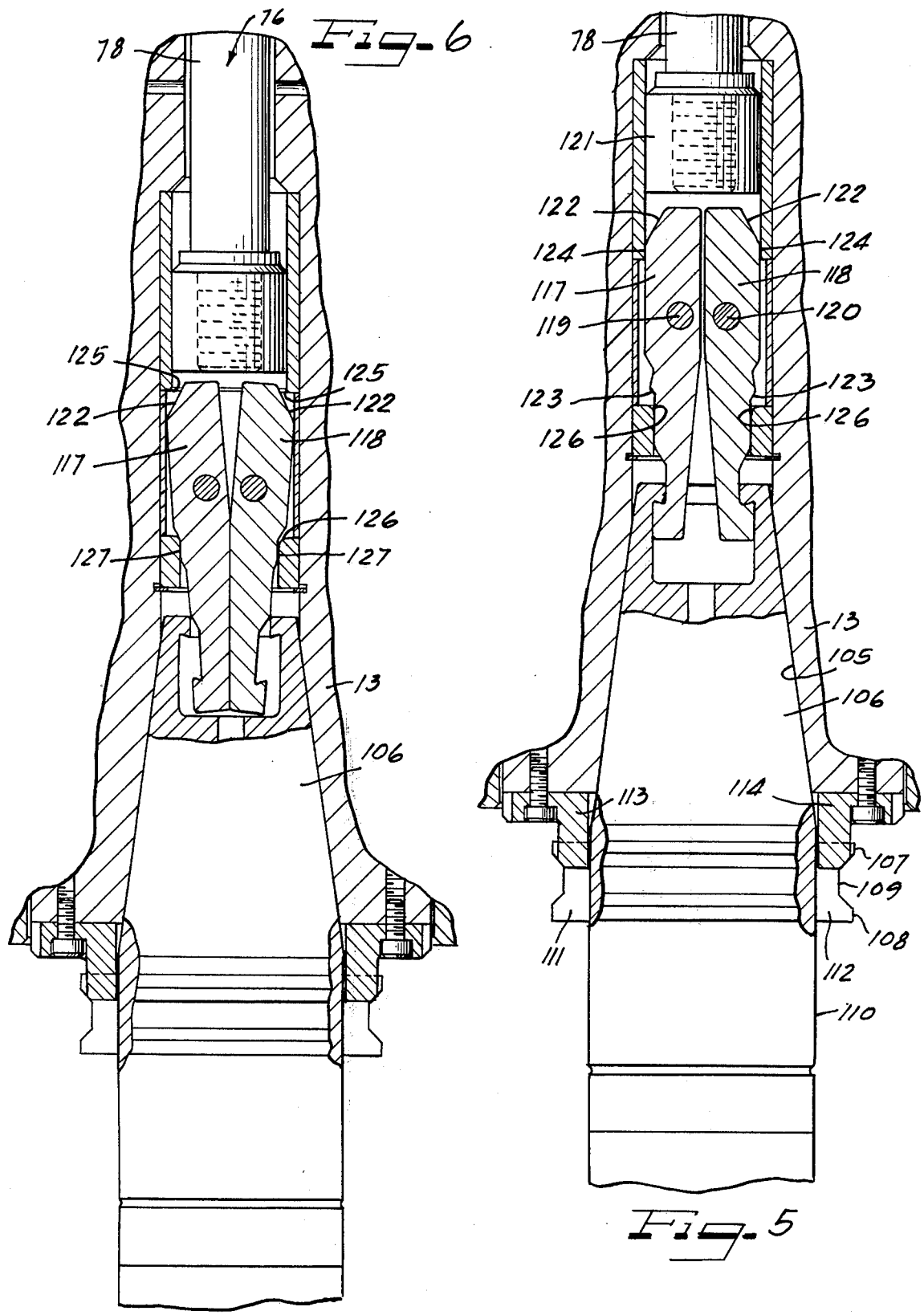

MACHINE TOOL SPINDLE

BACKGROUND OF THE INVENTION

Related Cases

This application is a division of my copending application, Ser. No. 238,434, filed Mar. 27, 1972, now U.S. Pat. No. 3,893,371.

FIELD OF THE INVENTION

This invention relates to machine tools, and more specifically to one having a rotary tool-holding spindle that is provided with apparatus for holding a tool in the spindle.

PRIOR ART

A variety of machine tools having tool changers for changing or transferring rotary cutting tools have been previously manufactured or suggested. Various shortcomings have been noted which are disadvantageous. For instance, considerable complexity has been found in the past in connection with structure for clamping and releasing such tool with respect to the spindle.

SUMMARY OF THE INVENTION

The invention provides a machine tool comprising a head, a rotatably-driven axially movable spindle mounted on said head and adapted to drivably carry a tool, a spindle motor drivably connected to rotate said spindle, a quill rotatably supporting said spindle and slidably mounted on said head for enabling the axial movement of said spindle, a quill motor having a driving connection with said quill for reciprocating said quill, at least one reciprocably movable clamping member in said spindle adapted to drivingly clamp a tool therein, a reciprocable actuating means having a connection with said clamping member, and a fluid pressure actuated piston in said quill arranged to drive said actuating means.

The present invention will be better understood from the following detailed description of the accompanying drawings in which a preferred embodiment of the invention is shown by way of illustrative example, in which:

ON THE DRAWINGS

FIG. 2 is an enlarged cross sectional view of the upper portion of the spindle shown in FIG. 1;

FIG. 3 is a fragmentary cross sectional view taken from the left side of FIG. 2;

FIG. 4 is an enlarged cross sectional view of the lower portion of the spindle shown in FIG. 1;

FIG. 5 is an enlarged fragmentary cross sectional view taken along line VI—VI of FIG. 4 with a tool added; and FIG. 6 is a view of the structure of FIG. 5 in the tool releasing position.

AS SHOWN ON THE DRAWINGS

Figure 1:
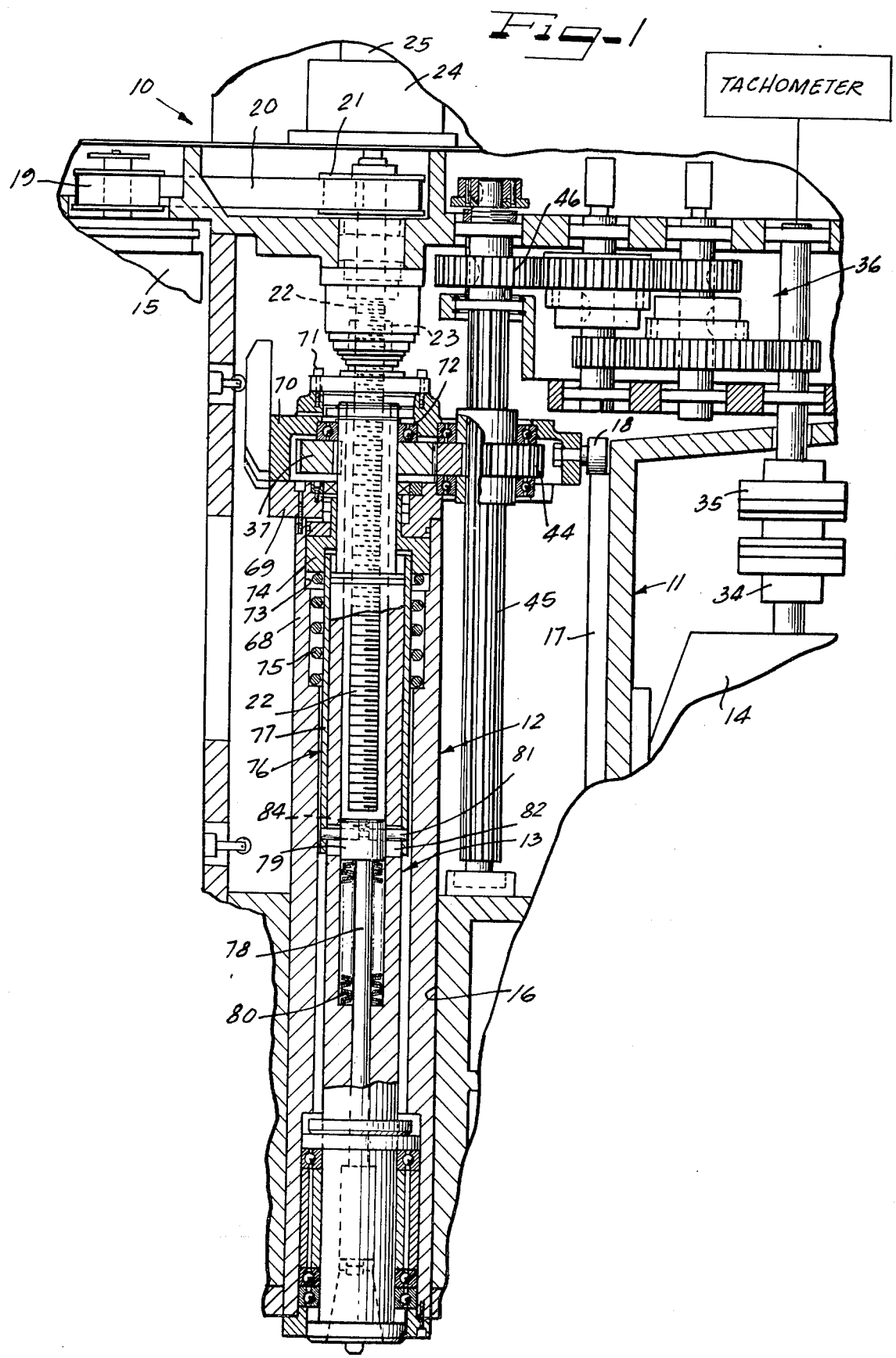
FIG. 1 is a fragmentary cross sectional view showing the spindle structure in a machine tool head provided in accordance with the principles of the present invention.

The present invention is a machine tool head such as fragmentarily shown in FIG. 1, generally indicated by the numeral 10. The machine tool head 10 is supported on a frame (not shown) which supports a workpiece-supporting table (not shown) in a known manner. The head 10 comprises a rigid casting or weldment 11 to which various components are secured. Normally, the machine tool is controlled by conventional numerical control circuitry for automatic operation and/or a set of manual controls.

As shown in FIG. 1, the head 10 supports a quill 12 within which there is disposed a spindle 13. A relatively large spindle motor 14 and a smaller quill motor 15 for reciprocating the quill 12 are secured to the weldment 11 of the head 10. The head 10 has a guide bore 16 which slidably guides the quill 12 for vertical movement parallel to the direction in which the head 10 can move. The head 10 includes internal vertical track means 17 which are straddled by a pair of rollers 18 on the quill 12 to restrain the quill against any angular movement about the rotational axis of the spindle 13. The quill 12 supports the spindle 13 for rotation within the quill, doing so in a manner that renders the quill and the spindle comovable vertically. Thus vertical movement of the quill 12 moves the spindle 13 vertically a like amount.

The quill motor 15 has a pulley 19 about which a belt 20 extends to drive a pulley 21 that is coaxial with the spindle 13. The pulley 21 is corotatably secured to a threaded shaft 22 which has a threaded connection with a nut 23 that is fixably secured to the upper end of the quill 12. The motor 15 is reversible and the threaded shaft 22 is axially fixed, whereby through the nut 23, the entire quill assembly is vertically reciprocated. Reciprocation forces are thus applied concentrically with the tool so that during the feeding of the tool, there is no tendency for the quill to cock or rock within whatever clearance is inherently necessary for its guiding support.

A brake 24 is provided at the upper end of the rotatable screw 23, is of conventional construction and is arranged to act between the screw 23 and the head 10. In addition, there is secured to the rotatable screw 23 a reader 25 of conventional construction for emitting signals to the control system which indicate actual rotation of the screw 23.

The spindle motor 14 normally operates continually and has an output shaft that is connected through a pair of couplings 34, 35 to a gear train generally indicated at 36. The spindle 13 has a gear 37 at its upper end within the upper end of the quill 12, and the gear train 36 is drivably connected to the spindle gear 37 to rotate the spindle, as shown and as more fully described in the aforesaid application.

The spindle gear 37 is driven by a gear 44 with which it meshes and which is trapped in the upper part of the quill 12. The gear 44 is internally splined and mates with an elongated spline shaft 45 which corotatably carries a driven gear 46 forming a part of the gear train 36.

The quill 12 is an assembly of an elongated tubular body 68 which is slidably guided in the bore 16, and a two-piece head portion 69, 70 which portions 69, 70 are bolted together and bolted to the body 68. The nut 23 is in turn bolted as at 71 to the upper portion 70 of the quill 12. The spindle 13 is supported by a bearing assembly 72 at its upper end, the bearing assembly 72 being contained within the quill portion 70 adjacent to the spindle gear 37. The tubular quill body 68 has a cylinder bore 73 within which there is disposed a piston 74 which is upwardly biased by a spring 75 which encircles the spindle 13, acting between a shoulder within the quill body 68 and the piston 74. Upward movement of the piston 74 is limited by engagement between the piston and the lower end of the quill portion 69. The outside diameter of the piston 74 is stepped, as is the inside diameter of the adjacent portions of the quill 12. Suitable seals and packings are provided as shown where required.

The annular piston 74 is arranged to act upon actuating means generally indicated at 76. The actuating means 76 includes an actuating sleeve 77 which is slidably carried on the spindle 13 extending through the spring 75 in normally slightly axially spaced position from the lower face of the annular piston 74. When the piston 74 is actuated in a downward direction, the annular piston 74 forces the actuating sleeve 77 downwardly. At its lower end, the actuating means 76 includes an actuating rod 78 which has a head 79 slidably guided within the spindle 13 and biased in an upward direction by a set of Belleville springs 80 which act between the spindle and the head 79 of the actuating rod 78. A pin 81 extends through the head 79, through a vertically elongated slot 82 in the spindle 13 and into the lower end of the actuating sleeve 77 so as to form a radial pin connection between the sleeve 77 and rod 78 portions of the actuating means 76. The spring means 80 thus biases the entire actuating means 76 upwardly by an amount that would be limited by the engagement between the pin 80 and the end of the slot 82 but for the presence of tooling as explained below. A set screw 84 enters a radial groove in the pin 81 to serve as a retainer.

FIG. 2 shows the upper portion of the quill 12 and spindle 13 in greater detail, particularly as to the seals for the annular piston 74 and its chamber.

FIG. 3 shows the structure of FIG. 2 as viewed from the left side thereof, and in addition, shows lubrication passages 90 for lubricating the piston 74. In addition, a labyrinth seal 91 is shown structurally instead of diagrammatically. More importantly, there is illustrated a fluid port 92 for providing pressurized fluid to an annular groove 93 at the upper face of the piston 74 and thus to the entire upper face of the piston 74 as soon as movement has begun.

FIG. 4 shows primarily the bearing structure by which the lower end of the spindle 13 is supported in the quill 12. The spindle 13 has its largest diameter at the lower end and has a progression of successively smaller diameters along its length. A nut 94 is placed on the spindle 13 prior to assembly thereof along with a locking ring 95 so as to provide an adjustable downwardly facing shoulder engaged by a labyrinth seal 96 which is engaged by a bearing assembly 97 of the thrust bearing type. The bearing 97 transfers downwardly directed forces from the spindle 13 to the quill 12, and thus the bearing 97 supports all the structure carried by the spindle 13 under conditions where no cutting is taking place. The outer race of the bearing 97 engages a tubular member 98 and the inner race of the bearing 97 engages a smaller tubular member 99, such tubular members 98, 99 respectively engaging the outer and inner races of a thrust bearing 100 whose races correspondingly engage the races of a further thrust bearing 101. A flange 102 on the spindle 13 acts through a labyrinth seal 103 against the inner race of the bearing 101 and the inner race of the bearing 100 to transfer a force during cutting to the outer races at the lower end of the quill 12 through the outer tubular spacer 98 and the outer race of the bearing 97 and the labyrinth seal 96 to an internal shoulder on the quill 12. The components 96–101 and 103 are held in position by a clamp ring 104. Any axial play in the spindle is taken out by the adjusting nut 94.

As best seen in FIG. 5, the spindle 13 has a tapered socket 105 for receiving tooling such as a tool or tool adpater 106 having a corresponding taper. The tool 106 has a pair of spaced flanges 107, 108 with a groove 109 therebetween and a straight portion 110 therebelow to enable the same to be utilized in a particular type of tool changer. The flanges 107, 108 are slotted as at 111 and 112 at diametrically opposite positions, and the spindle 13 is provided with a pair of downwardly projecting lugs 113, 114 which project into the slots 111, 112 respectively to provide positive angular driving of the tool 106.

As shown in FIG. 5, at least one and preferably two clamping members 117, 118 are provided to hold the tool 106 in the position illustrated. Each clamping member 117, 118 is pivotally supported as at 119, 120 for rocking between the clamped position illustrated in FIG. 5 and the released position illustrated in FIG. 6. As better seen in FIG. 4, the lower end of the actuating rod 78 has threaded thereto an elongated split block 121 which supports the opposite ends of the pivot pins 119, 120 and which is slidably guided within the spindle 13. Each of the clamping members 117, 118 has a cam surface 122 and a cam surface 123. Immediately below the cam surface 122, there is a straight portion 124. When the clamping members 117, 118 are in the released position as shown in FIG. 6 by virtue of the actuating means 76 being in the lowered position, the upper ends of the clamping members 117, 118 are received in a recess or groove. When fluid pressure is relieved from the piston 74 the actuating means 76 raises under the influence of the springs 80 and draws the clamping members 117, 118 upwardly to cause the cam surfaces 122 to engage an abutment 125 in the spindle whereby the clamping members' upper ends are rocked together from the position shown in FIG. 6 to the position shown in FIG. 5, and further upward movement causes the straight portions 124 to engage a locking surface just above the abutments 125.

When the actuating means 76 moves the clamping members 117, 118 in a downward direction from the position illustrated in FIG. 5 to the position illustrated in FIG. 6 to release a tool, the cam surfaces 123 engage a lower abutment 126 just after the straight portions 124 have cleared the abutments 125 so as to cause the lower ends of the clamping members 117, 118 to move together. As the downward movement continues, a straight portion 127 on each of the clamping members 117, 118 comes into engagement with a locking surface just below the lower abutments 126 to positively hold the clamping members in the released position. When the clamping members 117, 118 are disposed as shown in FIG. 6, the tool 106 is free to drop out of the spindle 13.

The lower ends of the clamping members 117, 118 are adapted to cooperate with appropriate structure on the tool 106 as shown.

During normal cutting, the tool 106 is held as shown in FIG. 5, the spindle 13 is driven rotatably, and the quill 12 is driven downwardly for a distance and on completion of machining is retracted. To change to a different tool, fluid power is delivered to the port 92 for driving the piston 74 downwardly, thereby moving the clamping members 117, 118 from the position shown in FIG. 5 to the position shown in FIG. 6 to enable tool change. When a new tool has been inserted as shown in FIG. 6 and locked in place as shown in FIG. 5, the machine tool may go forward with its next cutting operation.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A machine tool comprising in combination:
   a. a head;
   b. a tubular quill non-rotatably axially-slidably mounted on said head;
   c. an electric quill motor having a driving connection with said quill for axially reciprocating said quill;
   d. a tubular spindle rotatably mounted by and within said quill and supported by said quill against relative axial movement with respect to the quill, but axially movable therewith during machining;
   e. a spindle motor drivably connected to rotate said spindle with respect to said quill;
   f. an annular fluid-pressure-actuated piston sealingly engaging a bore in said quill and encircling said spindle;
   g. at least one reciprocably movable clamping member in said spindle adapted to drivingly clamp a tool in an end of said spindle; and
   h. a reciprocable actuating means having a portion disposed radially outside of said spindle, said portion being adapted to be axially driven by said piston and said means having a further portion radially inside the spindle and having a connection with said clamping member for driving said clamping member.

2. A machine tool according to claim 1, including:
   a. a first spring means within said spindle acting between said spindle and said actuating means, and applying a force to said actuating means in a tool-clamping direction; and
   b. a second spring means encircling said spindle and acting between said axially slidable quill and said piston, and applying a force to said piston in tool-clamping direction.

3. A machine tool according to claim 1, including:
   a. first bearing means acting between the lower ends of said quill and said spindle for axially supporting the combined mass of said spindle, said actuating means and said clamping member under no-load conditions; and
   b. second bearing means disposed axially between the tool-end of said spindle and said first bearing means, and acting between the lower ends of said quill and said spindle, and adapted to transfer the axial load from the tool on said spindle through a portion of said first bearing means to said quill.

4. A machine tool according to claim 1 in which:
   a. said movable clamping member is freely pivotally carried at the end of said actuating means;
   b. said clamping member having a first cam surface disposed at the side of its pivotal axis which is the more remote from the tool end and a second cam surface disposed at the other side of its pivotal axis; and
   c. a pair of axially spaced abutments within said spindle, a first of said abutments being the more remote from said tool end and engageable with said first cam surface in response to retraction of said actuating means for moving said clamping member to a tool-clamping position, and a second of said abutments being nearer said tool end and engageable with said second cam surface in response to extension of said actuating means for moving said clamping member to a tool-releasing position.

5. A machine tool according to claim 4 including a first locking surface disposed above said upper abutment for holding said clamping member in said tool-clamping position, and a second locking surface disposed below said lower abutment for holding said clamping member in said tool-releasing position.

6. A machine tool according to claim 1 in which said reciprocable actuating means comprises:
   a. an actuating sleeve driven by said piston and surrounding said spindle;
   b. an actuating rod disposed within said spindle and having said connection with said clamping member; and
   c. a radial pin connection between said actuating sleeve and said actuating rod extending through longitudinally elongated slot means in said spindle.

7. A machine tool according to claim 6 in which said driving connection of said quill motor includes:
   a. a nut coaxially and non-rotatably secured to said quill; and
   b. a screw rotatably driven by said quill motor for reciprocating said nut, said screw being receivable in an axial bore in said spindle substantially coextensibly with the longitudinal length of said acutating sleeve.

* * * * *